United States Patent
Park et al.

(10) Patent No.: US 10,629,946 B2
(45) Date of Patent: Apr. 21, 2020

(54) ELECTROLYTE FOR LITHIUM-SULFUR BATTERY, AND LITHIUM-SULFUR BATTERY COMPRISING SAME

(71) Applicant: LG CHEM, LTD., Seoul (KR)

(72) Inventors: Intae Park, Daejeon (KR); Sungwon Hong, Daejeon (KR); Charles Kiseok Song, Daejeon (KR); Youhwa Ohk, Daejeon (KR); Doo Kyung Yang, Daejeon (KR); Changhoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 73 days.

(21) Appl. No.: 15/767,289

(22) PCT Filed: Mar. 10, 2017

(86) PCT No.: PCT/KR2017/002579
§ 371 (c)(1),
(2) Date: Apr. 10, 2018

(87) PCT Pub. No.: WO2017/183810
PCT Pub. Date: Oct. 26, 2017

(65) Prior Publication Data
US 2018/0301739 A1    Oct. 18, 2018

(30) Foreign Application Priority Data

Apr. 22, 2016  (KR) .................. 10-2016-0049531
Mar. 7, 2017   (KR) .................. 10-2017-0028619

(51) Int. Cl.
*H01M 10/052*    (2010.01)
*H01M 10/0567*   (2010.01)
(Continued)

(52) U.S. Cl.
CPC ..... *H01M 10/052* (2013.01); *H01M 10/0563* (2013.01); *H01M 10/0567* (2013.01);
(Continued)

(58) Field of Classification Search
None
See application file for complete search history.

(56) References Cited

U.S. PATENT DOCUMENTS

| | | | | |
|---|---|---|---|---|
| 3,796,604 A | * | 3/1974 | Gabano et al. | ......... H01M 6/16 |
| | | | | 429/335 |
| 5,776,635 A | | 7/1998 | Gan et al. | |

(Continued)

FOREIGN PATENT DOCUMENTS

| | | |
|---|---|---|
| EP | 3333963 A1 | 6/2018 |
| JP | 2924329 B2 | 7/1999 |

(Continued)

OTHER PUBLICATIONS

International Search Report for PCT/KR2017/002579 (PCT/ISA/210) dated Jun. 30, 2017.

(Continued)

*Primary Examiner* — Ula C Ruddock
*Assistant Examiner* — Amanda Rosenbaum
(74) *Attorney, Agent, or Firm* — Birch, Stewart, Kolasch & Birch, LLP

(57) ABSTRACT

The present invention relates to a liquid electrolyte for a lithium-sulfur battery and a lithium-sulfur battery including the same.
The liquid electrolyte for a lithium-sulfur battery according to the present invention exhibits excellent stability, and may improve a swelling phenomenon by suppressing gas generation during lithium-sulfur battery operation.

11 Claims, 1 Drawing Sheet

(51) Int. Cl.
*H01M 10/0568* (2010.01)
*H01M 10/0569* (2010.01)
*H01M 10/0563* (2010.01)
*H01M 4/38* (2006.01)

(52) U.S. Cl.
CPC ... *H01M 10/0568* (2013.01); *H01M 10/0569* (2013.01); *H01M 4/38* (2013.01); *H01M 4/382* (2013.01)

(56) References Cited

U.S. PATENT DOCUMENTS

| | | | |
|---|---|---|---|
| 6,218,054 | B1 | 4/2001 | Webber |
| 7,553,590 | B2* | 6/2009 | Mikhaylik ............ H01M 4/13 429/218.1 |
| 2004/0009393 | A1 | 1/2004 | Kim et al. |
| 2005/0147891 | A1 | 7/2005 | Mikhaylik |
| 2011/0117407 | A1 | 5/2011 | Huang |
| 2014/0106238 | A1 | 4/2014 | Giroud et al. |
| 2014/0106239 | A1 | 4/2014 | Barchasz et al. |
| 2015/0249269 | A1 | 9/2015 | Yoon et al. |
| 2015/0318532 | A1* | 11/2015 | Manthiram ......... H01M 2/1686 429/105 |

FOREIGN PATENT DOCUMENTS

| | | |
|---|---|---|
| JP | 2003-123758 A | 4/2003 |
| JP | 2005-243518 A | 9/2005 |
| JP | 2008-300313 A | 12/2008 |
| JP | 5560337 B2 | 7/2014 |
| JP | 2014-523083 A | 9/2014 |
| KR | 10-2004-0006429 A | 1/2004 |
| KR | 10-2005-0038897 A | 4/2005 |
| KR | 10-2011-0042085 A | 4/2011 |
| KR | 10-1167334 B1 | 7/2012 |
| KR | 10-2014-0034087 A | 3/2014 |
| KR | 10-2014-0051895 A | 5/2014 |
| KR | 10-2014-0066589 A | 6/2014 |
| KR | 10-2015-0102916 A | 9/2015 |
| KR | 10-2016-0042525 A | 4/2016 |

OTHER PUBLICATIONS

Mikhaylik et al., "High Energy Rechargeable Li—S Cells for EV Application. Status, Remaining Problems and Solutions", ECS Transactions, 2010, 25 (35), pp. 23-34.
Extended European Search Report, dated Dec. 12, 2018, for European Application No. 17786079.8.

* cited by examiner

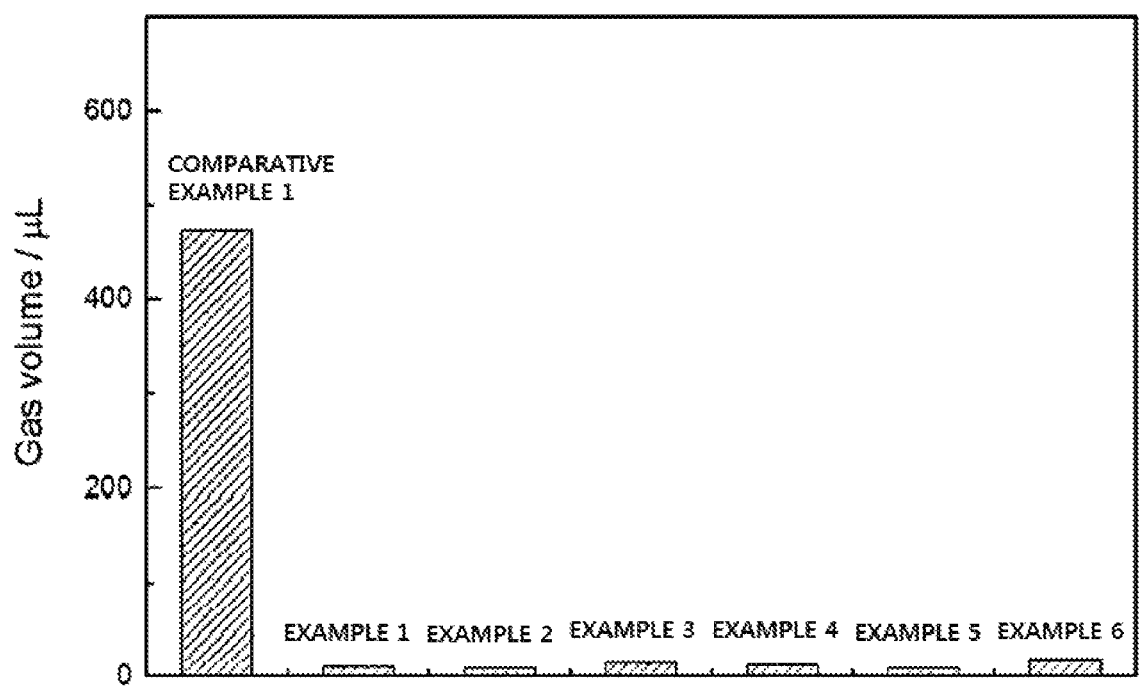

ELECTROLYTE FOR LITHIUM-SULFUR BATTERY, AND LITHIUM-SULFUR BATTERY COMPRISING SAME

TECHNICAL FIELD

This application claims priority to and the benefits of Korean Patent Application No. 10-2016-0049531, filed with the Korean Intellectual Property Office on Apr. 22, 2016, and Korean Patent Application No. 10-2017-0028619, filed with the Korean Intellectual Property Office on Mar. 7, 2017, the entire contents of which are incorporated herein by reference.

The present invention relates to a liquid electrolyte for a lithium-sulfur battery and a lithium-sulfur battery including the same.

BACKGROUND ART

With recent development of portable electronic devices, electric vehicles and large capacity power storage systems, demands for large capacity batteries have arisen. A lithium-sulfur battery is a secondary battery using a sulfur series material having sulfur-sulfur bonds (S—S bonds) as a positive electrode active material and using lithium metal as a negative electrode active material, and sulfur, a main material of a positive electrode active material, has advantages of being very abundant in resources, having no toxicity and having a low atomic weight.

In addition, a lithium-sulfur battery has theoretical discharge capacity of 1672 mAh/g-sulfur and theoretical energy density of 2,600 Wh/kg, which is very high compared to theoretical energy density of other battery systems currently studied (Ni-MH battery: 450 Wh/kg, Li—FeS battery: currently studied (Ni-MH battery: 450 Wh/kg, Li—FeS battery: 480 Wh/kg, Li—MnO$_2$ battery: 1,000 Wh/kg, Na—S battery: 800 Wh/kg), and therefore, has received attention as a battery having a high energy density property.

However, a lithium-sulfur battery has not been commercialized so far due to a low sulfur utilization rate and thereby failing to secure sufficient capacity as theoretical capacity, and a battery short circuit problem caused by dendrite formation of a lithium metal electrode. In view of the above, positive electrode materials having increased sulfur impregnation, liquid electrolytes capable of increasing a sulfur utilization rate, and the like have been developed in order to resolve such problems.

As a liquid electrolyte solvent of a lithium-sulfur battery, a mixed solvent of 1,3-dioxolane (DOL) and 1,2-dimethoxyethane (DME) has been currently used most often. A liquid electrolyte using the solvent has excellent properties in terms of a sulfur utilization rate. However, from experimental results of the inventors of the present invention, a swelling phenomenon, in which gas is generated inside and the battery swells up while operating the battery using the liquid electrolyte, was observed. Such a swelling phenomenon causes liquid electrolyte depletion, and battery deformation, and also causes active material deintercalation from an electrode resulting in a problem of declining battery performance.

Causes and generation mechanism of such a swelling phenomenon caused by gas generation inside a battery have not yet been identified, and accordingly, there are no countermeasures as well.

PRIOR ART DOCUMENTS

U.S. Pat. No. 6,218,054, Dioxolane and dimethoxyethane electrolyte solvent system

DISCLOSURE

Technical Problem

In view of the above, the inventors of the present invention have studied liquid electrolyte solvent compositions of a lithium-sulfur battery, and as a result, have completed the present invention.

Accordingly, an aspect of the present invention provides a liquid electrolyte for a lithium-sulfur battery significantly reducing an amount of gas generation during battery operation.

Another aspect of the present invention provides a lithium-sulfur battery including the liquid electrolyte.

Technical Solution

According to an aspect of the present invention, there is provided a liquid electrolyte for a lithium-sulfur battery including a lithium salt and a non-aqueous solvent, wherein the non-aqueous solvent includes cyclic ether including one oxygen in a ring structure, and linear ether, and, in the linear ether, bond dissociation energy of a C—O bond when receiving one electron is greater than −19.9 kcal/mol when calculating using a DFT M06-2X method.

Herein, the linear ether may be represented by the following Chemical Formula 1.

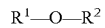
[Chemical Formula 1]

(In Chemical Formula 1, R$^1$ and R$^2$ are the same as described in the specification.)

R$^1$ and R$^2$ are the same as or different from each other, and may be each independently a methyl group, an ethyl group, a propyl group, an isopropyl group, a butyl group, an isobutyl group, a tert-butyl group, a pentyl group or a hexyl group.

Specifically, the linear ether may be one or more types selected from the group consisting of dimethyl ether, diethyl ether, dipropyl ether, diisopropyl ether, dibutyl ether, dipentyl ether, dihexyl ether, ethylmethyl ether, methylpropyl ether, butylmethyl ether, ethylpropyl ether, butylpropyl ether, phenylmethyl ether, diphenyl ether, dibenzyl ether, bis(fluoromethyl)ether, 2-fluoromethyl ether, 1,1,2,2-tetrafluoroethyl-2,2,3,3-tetrafluoropropyl ether, bis(2,2,2-trifluoroethyl)ether, propyl-1,1,2,2-tetrafluoroethyl ether, isopropyl-1,1,2,2-tetrafluoroethyl ether, 1,1,2,2-tetrafluoroethylisobutyl ether, 1,1,2,3,3,3-hexafluoropropylethyl ether, 1H,1H,2'H,3H-decafluorodipropyl ether and 1H,1H,2'H-perfluorodipropyl ether.

The cyclic ether may be 5-membered to 7-membered cyclic ether unsubstituted or substituted with a C1 to C4 alkyl group or alkoxy group, and may be tetrahydrofuran or tetrahydropyran unsubstituted or substituted with a C1 to C4 alkyl group or alkoxy group.

Specifically, the cyclic ether may be one or more types selected from the group consisting of tetrahydrofuran, 2-methyltetrahydrofuran, 3-methyltetrahydrofuran, 2,3-dimethyltetrahydrofuran, 2,4-dimethyltetrahydrofuran, 2,5-dimethyltetrahydrofuran, 2-methoxytetrahydrofuran, 3-methoxytetrahydrofuran, 2,5-dimethoxytetrahydrofuran, 2-ethoxytetrahydrofuran, 3-ethoxytetrahydrofuran, tetrahydropyran, 2-methyltetrahydropyran, 3-methyltetrahydropyran and 4-methyltetrahydropyran.

A volume ratio of the cyclic ether and the linear ether may be from 5:95 to 95:5, and preferably from 30:70 to 70:30.

The lithium salt may be one type selected from the group consisting of LiCl, LiBr, LiI, LiClO$_4$, LiBF$_4$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof, and the lithium salt may be included in a concentration of 0.1 M to 4.0 M.

The liquid electrolyte of the present invention may further include an additive having N—O bonds in a molecule.

The additive may be one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide and tetramethylpiperidinyloxyl, and the additive may be included in 0.01% by weight to 10% by weight with respect to 100% by weight of the liquid electrolyte.

According to another aspect of the present invention, there is provided a lithium-sulfur battery including the liquid electrolyte.

Advantageous Effects

A liquid electrolyte for a lithium-sulfur battery according to the present invention has excellent stability and has a significantly small amount of gas generation during battery operation. As a result, a swelling phenomenon of a battery can be improved.

DESCRIPTION OF DRAWINGS

FIG. 1 is a graph comparing amounts of gas generation of Experimental Example 1.

BEST MODE

Hereinafter, embodiments of the present invention will be described in detail with reference to accompanying drawings so that those skilled in the art may readily implement the present invention. However, the present invention may be implemented in various different forms, and is not limited to the examples described herein.

Liquid Electrolyte for Lithium-Sulfur Battery

In order to improve a swelling phenomenon caused by gas such as hydrogen generated during lithium-sulfur battery operation, the present invention provides a liquid electrolyte for a lithium-sulfur battery including cyclic ether including one oxygen in a ring structure, and linear ether as a non-aqueous solvent, and, in the linear ether, bond dissociation energy of a C—O bond when receiving one electron is greater than −19.9 kcal/mol when calculating using a DFT M06-2X method.

A solvent currently used most widely as a liquid electrolyte solvent of a lithium-sulfur battery is a mixed solvent of 1,3-dioxolane (DOL) and 1,2-dimethoxyethane (DME). Using a mixed solvent of DOL and DME enhances a sulfur utilization rate, and excellent results are obtained in terms of battery capacity.

Based on the results of experiments performed by the inventors of the present invention, a liquid electrolyte using the mixed solvent generally exhibits superior performance in terms of suppressing battery capacity decrease, battery life time and battery efficiency when used in small batteries, however, when used in large batteries such as large area pouch cells, a swelling phenomenon of gas such as hydrogen, methane and ethene being generated in considerable amounts and the battery swelling up is observed.

Generation mechanism of the gas generated in a battery has not been clearly identified, but is identified to be due to liquid electrolyte decomposition, and from the fact that it typically appears in a lithium-sulfur battery, sulfur radicals, lithium sulfide and the like generated during battery operation are considered to affect liquid electrolyte decomposition. In other words, it is considered that, while intramolecular bonds of a liquid electrolyte solvent molecule are broken by sulfur radicals and the like, terminal hydrogen or an alkyl group (for example, methyl or ethyl) of the solvent molecule is dissociated, and gas such as hydrogen, methane and ethene is generated therefrom. The gas produced as above receives thermal energy inside the battery and the gas volume may gradually expand, and as swelling becomes more serious with prolonged battery operation, active materials are deintercalated from electrodes, which may resultantly cause problems such as explosion.

The inventors of the present invention have studied stable solvent combinations for suppressing gas generation caused by the liquid electrolyte composition, and surprisingly, as a result of diversely reviewing properties of solvents having a significantly lower amount of gas generation during battery operation, have discovered that bond dissociation energy of a terminal substituent bonding to an oxygen atom of linear ether is closely related to liquid electrolyte stability. In other words, when using linear ether having higher bond dissociation energy compared to bond dissociation energy of DME, linear ether used in the art, obtained when a terminal group (methyl group) is dissociated while C—O bonds of the DME are broken, liquid electrolyte stability has been greatly enhanced, and the amount of gas generation has been significantly reduced. It has been identified that such an effect is obtained particularly when using the linear ether with cyclic ether including one oxygen atom in the molecule.

In view of the above, the present invention provides a liquid electrolyte composition capable of resolving the above-mentioned problems by selecting a liquid electrolyte having minimum bond dissociation energy so as to prevent liquid electrolyte decomposition caused by electrons while smoothly obtaining basic properties required as a liquid electrolyte, that is, functions such as lithium ion transfer.

More specifically, in the present invention, bond dissociation energy of a C—O bond in the linear ether when receiving one electron is greater than −19.9 kcal/mol when calculating using a DFT M06-2X method.

Herein, the C—O bond means bonding between a terminal substituent (substituent that does not include an oxygen atom such as an alkyl group, an aryl group or an arylalkyl group) of linear ether and an oxygen atom. In addition, when there are non-equivalent C—O bonds in the molecule due to different terminal substituents of linear ether, the lowest BDE becomes a base. In other words, C—O bonds in the linear ether molecule all preferably have BDE of greater than −19.9 kcal/mol.

The bond dissociation energy calculation may be carried out using a density functional theory (DFT) method (M06-2X/6-31+G* level) using Gaussian 09 program. More specifically, BDE may be calculated by, while employing dielectric constant=7.2 and initial charge of linear ether=−5 (in other words, state of neutral linear ether molecule receiving one electron to become an anion) under a conductor-like polarizable continuum model (CPCM), comparing reaction energy of a reaction dissociating a terminal substituent to a radical form and forming alkoxy anions by the C—O bonds inside the linear ether being broken.

As one example, BDE of diisopropyl ether is a value calculating reaction energy of a reaction represented by the following Reaction Formula 1 using the above-mentioned method. Diisopropyl ether has BDE of −8.1 kcal/mol, and is one of preferred linear ether to be used as the liquid electrolyte of the present invention.

[Reaction Formula 1]

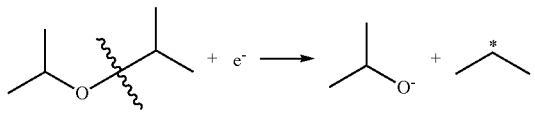

Such linear ether exhibits enhanced stability compared to 1,2-dimethoxyethane (BDE=−19.9 kcal/mol) used in the art. As a result, the linear ether exhibits excellent stability during battery operation when used with cyclic ether including one oxygen in a ring structure, and problems such as a liquid electrolyte depletion caused by liquid electrolyte decomposition, a swelling phenomenon caused by gas generation may be improved without declining battery properties.

The linear ether of the present invention may be linear ether represented by the following Chemical Formula 1.

$R^1$—O—$R^2$    [Chemical Formula 1]

(In Chemical Formula 1, $R^1$ and $R^2$ are the same as or different from each other, and each independently a C1 to C6 alkyl group unsubstituted or substituted with one or more fluorine, a C6 to C12 aryl group unsubstituted or substituted with one or more fluorine, or a C7 to C13 arylalkyl group unsubstituted or substituted with one or more fluorine.)

The C1 to C6 alkyl group mentioned in the present specification is a linear or branched alkyl group, and examples thereof may include a methyl group, an ethyl group, a propyl group, an isopropyl group, a butyl group, an isobutyl group, a sec-butyl group, a t-butyl group, a pentyl group, a hexyl group or the like. However, the C1 to C6 alkyl group is not limited thereto.

The linear ether may have a symmetrical structure in which $R^1$ and $R^2$ are the same with each other, or an asymmetrical structure in which $R^1$ and $R^2$ are different from each other. As one example, the linear ether may be a symmetrical-structured compound that is a C1 to C6 alkyl group in which $R^1$ and $R^2$ are the same with each other.

Examples of the C6 to C12 aryl group mentioned in the present specification may include a phenyl group or a naphthyl group unsubstituted or substituted with a C1 to C6 alkyl group.

Examples of the C7 to C13 arylalkyl group mentioned in the present specification may include a benzyl group, a phenylethyl group, a phenylpropyl group or a phenylbutyl group unsubstituted or substituted with a C1 to C6 alkyl group.

One or more hydrogens of the C1 to C6 alkyl group, the C6 to C12 aryl group and the C7 to C13 arylalkyl group may be substituted with fluorine.

The cyclic ether including one oxygen in a ring structure is 5-membered or higher cyclic ether unsubstituted or substituted with an alkyl group, preferably 5-membered to 7-membered cyclic ether unsubstituted or substituted with a C1 to C4 alkyl group or alkoxy group, and more preferably tetrahydrofuran or tetrahydropyran unsubstituted or substituted with a C1 to C4 alkyl group or alkoxy group.

Nonlimiting examples thereof may include tetrahydrofuran, 2-methyltetrahydrofuran, 3-methyltetrahydrofuran, 2,3-dimethyltetrahydrofuran, 2,4-dimethyltetrahydrofuran, 2,5-dimethyltetrahydrofuran, 2-methoxytetrahydrofuran, 3-methoxytetrahydrofuran, 2,5-dimethoxytetrahydrofuran, 2-ethoxytetrahydrofuran, 3-ethoxytetrahydrofuran, tetrahydropyran, 2-methyltetrahydropyran, 3-methyltetrahydropyran, 4-methyltetrahydropyran and the like.

The cyclic ether has low viscosity and thereby has favorable ion mobility, and also have high oxidation-reduction stability, and therefore, exhibits high stability even when operating a battery for a long period of time.

In addition, the linear ether is linear ether including one oxygen in the molecular structure and having one or more hydrogens in the molecule unsubstituted or substituted with fluorine. Nonlimiting examples thereof may include dimethyl ether, diethyl ether, dipropyl ether, diisopropyl ether, dibutyl ether, diisobutyl ether, dipentyl ether, dihexyl ether, ethylmethyl ether, methylpropyl ether, butylmethyl ether, ethylpropyl ether, butylpropyl ether, phenylmethyl ether, diphenyl ether, dibenzyl ether, bis(fluoromethyl)ether, 2-fluoromethyl ether, 1,1,2,2-tetrafluoroethyl-2,2,3,3-tetrafluoropropyl ether, bis(2,2,2-trifluoroethyl)ether, propyl-1,1,2,2-tetrafluoroethyl ether, isopropyl-1,1,2,2-tetrafluoroethyl ether, 1,1,2,2-tetrafluoroethylisobutyl ether, 1,1,2,3,3,3-hexafluoropropylethyl ether, 1H,1H,2'H,3H-decafluorodipropyl ether, 1H,1H,2'H-perfluorodipropyl ether or the like. The linear ether has effects of suppressing polysulfide dissolution and solvent decomposition.

Preferably, the cyclic ether may be tetrahydrofuran, 2-methyltetrahydrofuran, 2,5-dimethyltetrahydrofuran, tetrahydropyran or 2-methyltetrahydropyran, and the linear ether may be dipropyl ether, diisopropyl ether, dibutyl ether, diisobutyl ether or bis(fluoromethyl)ether.

According to one preferred example of the present invention, a combination of tetrahydrofuran and dipropyl ether (BDE=−7.5 kcal/mol), a combination of tetrahydrofuran and diisopropyl ether (BDE=−8.1 kcal/mol), a combination of tetrahydrofuran and diisobutyl ether (BDE=−7.5 kcal/mol), a combination of tetrahydrofuran and dibutyl ether (BDE=−8.7 kcal/mol), a combination of tetrahydropyran and dipropyl ether, or the like may be used as the liquid electrolyte solvent of the present invention.

The volume ratio of the cyclic ether and the linear ether is from 5:95 to 95:5 and preferably from 30:70 to 70:30. When the volume ratio is outside the above-mentioned range, target effects may not be obtained since an effect of suppressing gas generation during battery operation is insignificant, and therefore, the ratio is properly controlled within the above-mentioned range.

The electrolyte of the present invention includes a lithium salt added to an electrolyte for increasing ion conductivity. The lithium salt is not particularly limited in the present invention, and those that may be commonly used in lithium secondary batteries may be used without limit. Specifically, the lithium salt may be one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium (herein, lower aliphatic may mean, for example, aliphatic having 1 to 5 carbon groups), lithium tetraphenylborate, lithium imide and combinations thereof, and preferably, (CF$_3$SO$_2$)$_2$NLi may be used.

The concentration of the lithium salt may be determined considering ion conductivity and the like, and may be preferably from 0.1 M to 4.0 M, or 0.5 M to 2.0 M. When the lithium salt concentration is less than the above-mentioned range, ion conductivity suitable for battery operation is difficult to secure, and when the concentration is greater than above-mentioned range, viscosity of the liquid electrolyte increases decreasing lithium ion mobility, and battery performance may decline due to an increase in the decomposition reaction of the lithium salt itself, and therefore, the concentration is properly controlled within the above-mentioned range.

The non-aqueous liquid electrolyte for a lithium-sulfur battery of the present invention may further include an additive having N—O bonds in the molecule. The additive is effective in forming a stable film in a lithium electrode and greatly enhancing charge and discharge efficiency. In addition, the additive enhances sulfur utilization of a positive electrode and stabilizes the liquid electrolyte, and therefore, is effective in enhancing battery properties.

Such an additive may be a nitrate- or nitrite-based compound, a nitro compound and the like. As one example, one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide, and tetramethylpiperidinyloxyl (TEMPO) may be used. According to one example of the present invention, lithium nitrate (LiNO$_3$) may be used.

The additive is used in a range of 0.01% by weight to 10% by weight and preferably 0.1% by weight to 5% by weight in 100% by weight of the whole liquid electrolyte composition. When the content is less than the above-mentioned range, the above-mentioned effects may not be secured, and when the content is greater than the above-mentioned range, resistance may increase due to the film, and therefore, the content is properly controlled within the above-mentioned range.

As described above, the liquid electrolyte for a lithium-sulfur battery according to the present invention uses a mixed solvent of cyclic ether and linear ether as the solvent for securing liquid electrolyte stability, and accordingly, gas generation in a battery may be suppressed during charge and discharge, and a swelling phenomenon may be improved.

The occurrence of swelling may be explained in various ways, and in the present invention, swelling occurrence is quantitatively identified through measuring an amount of gas generation.

The liquid electrolyte of the present invention has, when used in a lithium-sulfur battery, gas generation inside the battery measured after battery operation in the amount of 300 μL or less and preferably 100 μL or less. Herein, the value being smaller means less amount of gas generation, and such a decrease in the gas generation is a value with almost no swelling phenomenon of battery swelling up, and a value insignificantly affecting battery stability even when the swelling phenomenon occurs. In other words, when comparing with gas generation of approximately 500 μl in a different liquid electrolyte used in the art (refer to Comparative Example 1), gas generation is significantly low when using the liquid electrolyte provided in the present invention.

As a result, the liquid electrolyte of the present invention overcomes problems of battery performance decline caused by a swelling phenomenon and quality decline caused by battery deformation, and the amount of gas generation is significantly reduced without declining battery properties such as battery life time or efficiency when operating a lithium-sulfur battery.

Meanwhile, a method for preparing the liquid electrolyte according to the present invention is not particularly limited in the present invention, and common methods known in the art may be used.

Lithium-Sulfur Battery A lithium-sulfur battery according to the present invention uses the non-aqueous liquid electrolyte for a lithium-sulfur battery according to the present invention as a liquid electrolyte.

The lithium-sulfur battery according to the present invention has significantly reduced generation of gas such as hydrogen gas during operation, and may improve a problem of battery performance decline caused by active material deintercalation from an electrode and quality decline caused by battery deformation.

The constitution of the positive electrode, the negative electrode and the separator of the lithium-sulfur battery is not particularly limited in the present invention, and may follow constitutions known in the art.

Positive Electrode

The positive electrode according to the present invention includes a positive electrode active material formed on a positive electrode current collector.

As the positive electrode current collector, those capable of being used as a current collector in the art may all be used, and specifically, foamed aluminum, foamed nickel or the like having excellent conductivity may be preferably used.

The positive electrode active material may include elemental sulfur (S8), sulfur series compounds or mixtures thereof. The sulfur series compound may specifically be Li$_2$S$_n$ (n≥1), an organosulfur compound, a carbon-sulfur polymer ((C$_2$S$_x$)$_n$: x=2.5 to 50, n≥2) or the like. These may be used as a composite with a conductor since a sulfur material alone does not have electrical conductivity.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The positive electrode may further include a binder for binding of the positive electrode active material and the conductor and for binding on the current collector. The binder may include a thermoplastic resin or a thermosetting resin. For example, polyethylene, polyethylene oxide, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, water, isopropyl alcohol and the like may be included.

Negative Electrode

The negative electrode according to the present invention includes a negative electrode active material formed on a negative electrode current collector.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

As the negative electrode active material, a material capable of reversibly intercalating or deintercalating lithium ions (Li'), a material capable of reversibly forming a lithium-containing compound by reacting with lithium ions, lithium metal or a lithium alloy may be used. Examples of the material capable of reversibly intercalating or deintercalating lithium ions (Li') may include crystalline carbon, amorphous carbon or a mixture thereof. Examples of the material capable of reversibly forming a lithium-containing compound by reacting with lithium ions (Li') may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further include a binder for binding of the negative electrode active material and the conductor and for binding on the current collector, and specifically, the binder is the same as the binder of the positive electrode described above.

Separator

A common separator may be provided between the positive electrode and the negative electrode. The separator is a physical separator having a function of physically separating electrodes, and those commonly used as a separator may be used without particular limit, and particularly, those having an excellent electrolyte moisture retention ability while having low resistance for ion migration of the liquid electrolyte are preferred.

In addition, the separator enables lithium ion transfer between the positive electrode and the negative electrode while separating or insulating the positive electrode and the negative electrode from each other. Such a separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The positive electrode, the negative electrode and the separator included in the lithium-sulfur battery may each be prepared using common components and preparation methods, and although not particularly limited thereto, appearances of the lithium-sulfur battery may include a cylinder-type, a square-type, a pouch-type, a coin-type using a can, and the like.

Hereinafter, preferred examples are provided in order to illuminate the present invention, however, the following examples are for illustrative purposes only, and it is obvious to those skilled in the art that various changes and modifications may be made within the scope and technological ideas of the present invention, and such changes and modifications also belong to the attached claims.

EXAMPLE

Examples 1 to 6 and Comparative Example 1

(1) Preparation of Liquid Electrolyte

Non-aqueous liquid electrolytes of Examples 1 to 6 and Comparative Example 1 were prepared by adding LiTFSI ($(CF_3SO_2)_2NLi$) in a concentration of 1.0 M and adding an N—O additive to a mixed solvent having the composition of the following Table 1. Herein, LiTFSI ($(CF_3SO_2)_2NLi$) was used as a lithium salt, and solvents used herein are as follows.

THF: tetrahydrofuran
THP: tetrahydropyran
DIBE: diisobutyl ether (BDE=−7.5 kcal/mol)
DPE: dipropyl ether (BDE=−7.5 kcal/mol)
DOL: 1,3-dioxolane
DME: 1,2-dimethoxyethane (BDE=−19.9 kcal/mol)

TABLE 1

| | Solvent (Volume Ratio) | Lithium Salt | Additive |
|---|---|---|---|
| Example 1 | THF:DIBE (1:1) | 1.0M LiTFSI | 1 wt % $LiNO_3$ |
| Example 2 | THF:DIBE (3:7) | 1.0M LiTFSI | 1 wt % $LiNO_3$ |
| Example 3 | THF:DPE (1:1) | 1.0M LiTFSI | 1 wt % $LiNO_3$ |
| Example 4 | THF:DPE (1:1) | 1.0M LiTFSI | 1 wt % $LiNO_3$ |

TABLE 1-continued

| | Solvent (Volume Ratio) | Lithium Salt | Additive |
|---|---|---|---|
| Example 5 | THF:DPE (1:1) | 1.0M LiTFSI | 1 wt % LiNO$_3$, 1 wt % TEMPO |
| Example 6 | THF:DPE (1:1) | 1.0M LiTFSI | 1 wt % LiNO$_2$ |
| Comparative Example 1 | DOL:DME (1:1) | 1.0M LiTFSI | 1 wt % LiNO$_3$ |

(2) Manufacture of Lithium-Sulfur Battery

65% by weight of sulfur, 25% by weight of carbon black, and 10% by weight of polyethylene oxide were mixed with acetonitrile to prepare positive electrode active material slurry. The positive electrode active material slurry was coated on an aluminum current collector, and the result was dried to prepare a positive electrode having a size of 30 mm$^2$×50 mm$^2$ and a loading amount of 5 mAh/cm$^2$. In addition, lithium metal having a thickness of 150 μm was employed as a negative electrode.

The prepared positive electrode and the negative electrode were placed to face each other, and a polyethylene separator having a thickness of 20 μm was provided therebetween, and the result was filled with each of the liquid electrolytes of the examples and the comparative example.

Experimental Example 1: Analysis on Amount of Gas Generation after Charge and Discharge Each of the lithium-sulfur batteries of the examples and the comparative example was charged and discharged 5 times with a rate of 0.1 C at 25° C., gas was collected inside the battery, and then the amount of gas generation was measured through gas chromatography-mass spectrometry (GC/MS). The results are shown in the following Table 2 and FIG. 1.

As shown in the following Table 2, the batteries of Examples 1 to 6 had gas generation of 8.8 μL to 27.3 μL, and it was identified that a significant gas generation suppressing effect was obtained compared to 473 μL of Comparative Example 1.

TABLE 2

| | Solvent (Volume Ratio) | Lithium Salt | Additive | Amount of Gas Generation |
|---|---|---|---|---|
| Example 1 | THF:DIBE (1:1) | 1.0M LiTFSI | 1 wt % LiNO$_3$ | 10.7 μL |
| Example 2 | THF:DIBE (3:7) | 1.0M LiTFSI | 1 wt % LiNO$_3$ | 9.5 μL |
| Example 3 | THF:DPE (1:1) | 1.0M LiTFSI | 1 wt % LiNO$_3$ | 15.7 μL |
| Example 4 | THF:DPE (1:1) | 1.0M LiTFSI | 1 wt % LiNO$_3$ | 12.5 μL |
| Example 5 | THF:DPE (1:1) | 1.0M LiTFSI | 1 wt % LiNO$_3$, 1 wt % TEMPO | 8.8 μL |
| Example 6 | THF:DPE (1:1) | 1.0M LiTFSI | 1 wt % LiNO$_2$ | 27.3 μL |
| Comparative Example 1 | DOL:DME (1:1) | 1.0M LiTFSI | 1 wt % LiNO$_3$ | 473 μL |

The invention claimed is:

1. A liquid electrolyte for a lithium-sulfur battery comprising:
a lithium salt; and
a non-aqueous solvent,
wherein the non-aqueous solvent comprises a linear ether and a cyclic ether comprising one oxygen in a ring structure,
wherein in the linear ether, a bond dissociation energy of a C—O bond when receiving one electron is greater than −19.9 kcal/mol when calculating using a DFT M06-2X method,
wherein a volume ratio of the cyclic ether and the linear ether is from 30:70 to 70:30,
wherein the cyclic ether is tetrahydrofuran or tetrahydropyran unsubstituted or substituted with a C1 to C4 alkyl group or alkoxy group.

2. The liquid electrolyte for a lithium-sulfur battery of claim 1, wherein the linear ether is represented by the following Chemical Formula 1:

$$R^1\text{—O—}R^2 \quad \text{[Chemical Formula 1]}$$

in Chemical Formula 1,
R$^1$ and R$^2$ are the same as or different from each other, and each independently a C1 to C6 alkyl group unsubstituted or substituted with one or more fluorine, a C6 to C12 aryl group unsubstituted or substituted with one or more fluorine, or a C7 to C13 arylalkyl group unsubstituted or substituted with one or more fluorine.

3. The liquid electrolyte for a lithium-sulfur battery of claim 2, wherein R$^1$ and R$^2$ are the same as or different from each other, and each independently a methyl group, an ethyl group, a propyl group, an isopropyl group, a butyl group, an isobutyl group, a sec-butyl group, a t-butyl group, a pentyl group or a hexyl group.

4. The liquid electrolyte for a lithium-sulfur battery of claim 1, wherein the linear ether is one or more types selected from the group consisting of dimethyl ether, diethyl ether, dipropyl ether, diisopropyl ether, dibutyl ether, diisobutyl ether, dipentyl ether, dihexyl ether, ethylmethyl ether, methylpropyl ether, butylmethyl ether, ethylpropyl ether, butylpropyl ether, phenylmethyl ether, diphenyl ether, dibenzyl ether, bis(fluoromethyl)ether, 2-fluoromethyl ether, 1,1,2,2-tetrafluoroethyl-2,2,3,3-tetrafluoropropyl ether, bis(2,2,2-trifluoroethyl)ether, propyl-1,1,2,2-tetrafluoroethyl ether, isopropyl-1,1,2,2-tetrafluoroethyl ether, 1,1,2,2-tetrafluoroethylisobutyl ether, 1,1,2,3,3,3-hexafluoropropylethyl ether, 1H, 1H,2' H,3H-decafluorodipropyl ether and 1H,1H, 2'H-perfluorodipropyl ether.

5. The liquid electrolyte for a lithium-sulfur battery of claim 1, wherein the cyclic ether is one or more types selected form the group consisting of tetrahydrofuran, 2-methyltetrahydrofuran, 3-methyltetrahydrofuran, 2,3-dimethyltetrahydrofuran, 2,4-dimethyltetrahydrofuran, 2,5-dimethyltetrahydrofuran, 2-methoxytetrahydrofuran, 3-methoxytetrahydrofuran, 2,5-dimethoxytetrahydrofuran, 2-ethoxytetrahydrofuran, 3-ethoxytetrahydrofuran, tetrahydropyran, 2-methyltetrahydropyran, 3-methyltetrahydropyran and 4-methyltetrahydropyran.

6. The liquid electrolyte for a lithium-sulfur battery of claim 1, wherein the lithium salt includes one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof.

7. The liquid electrolyte for a lithium-sulfur battery of claim 1, wherein the lithium salt is included in a concentration of 0.1 M to 4.0 M.

8. The liquid electrolyte for a lithium-sulfur battery of claim 1, further comprising an additive having N—O bonds in a molecule.

9. The liquid electrolyte for a lithium-sulfur battery of claim 8, wherein the additive is one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide and tetramethylpiperidinyloxyl.

10. The liquid electrolyte for a lithium-sulfur battery of claim 8, wherein the additive is included in 0.01% by weight to 10% by weight with respect to 100% by weight of the liquid electrolyte.

11. A lithium-sulfur battery comprising the liquid electrolyte of claim 1.

\* \* \* \* \*